United States Patent [19]

Underwood

[11] Patent Number: 4,981,013
[45] Date of Patent: Jan. 1, 1991

[54] CORN HARVESTING APPARATUS

[76] Inventor: Chester E. Underwood, R.R. 1, Box 63C, Minneiska, Minn. 55910

[21] Appl. No.: 396,308

[22] Filed: Aug. 21, 1989

[51] Int. Cl.$^5$ .................... A01D 43/00; A01D 57/02
[52] U.S. Cl. ...................................... 56/104; 56/12.1; 56/119; 56/364
[58] Field of Search ............... 56/104, 12.1, 103, 107, 56/109, 114, 119, 115, 364, 473.5

[56] References Cited

U.S. PATENT DOCUMENTS

| | | | |
|---|---|---|---|
| 3,492,797 | 2/1970 | Sears | 56/119 |
| 3,719,034 | 3/1973 | Lange | 56/119 |
| 3,771,300 | 11/1973 | Jourdan | 56/119 |
| 4,301,644 | 11/1981 | Henderson | 56/119 |
| 4,438,619 | 3/1984 | Heim et al. | 56/119 |
| 4,524,571 | 6/1985 | Mak et al. | 56/119 |
| 4,841,718 | 6/1989 | Sund | 56/364 |

Primary Examiner—Ramon S. Britts
Assistant Examiner—Terry Lee Melius
Attorney, Agent, or Firm—Leon Gilden

[57] ABSTRACT

A corn harvesting apparatus is set forth wherein a shovel-like hopper includes a conveyor cylinder mounted rearwardly of the hopper for directing harvested corn to a combine storage. Rotatably mounted forwardly of the hopper is a harvesting cylinder formed with coaxially aligned rows of spikes about the periphery with a stacked series of barbed ends formed thereon. The corn ears are pierced and directed to the conveyor and are stripped from the spikes by a stripper plate formed with slots aligned circumferentially with the rows of spikes.

5 Claims, 1 Drawing Sheet

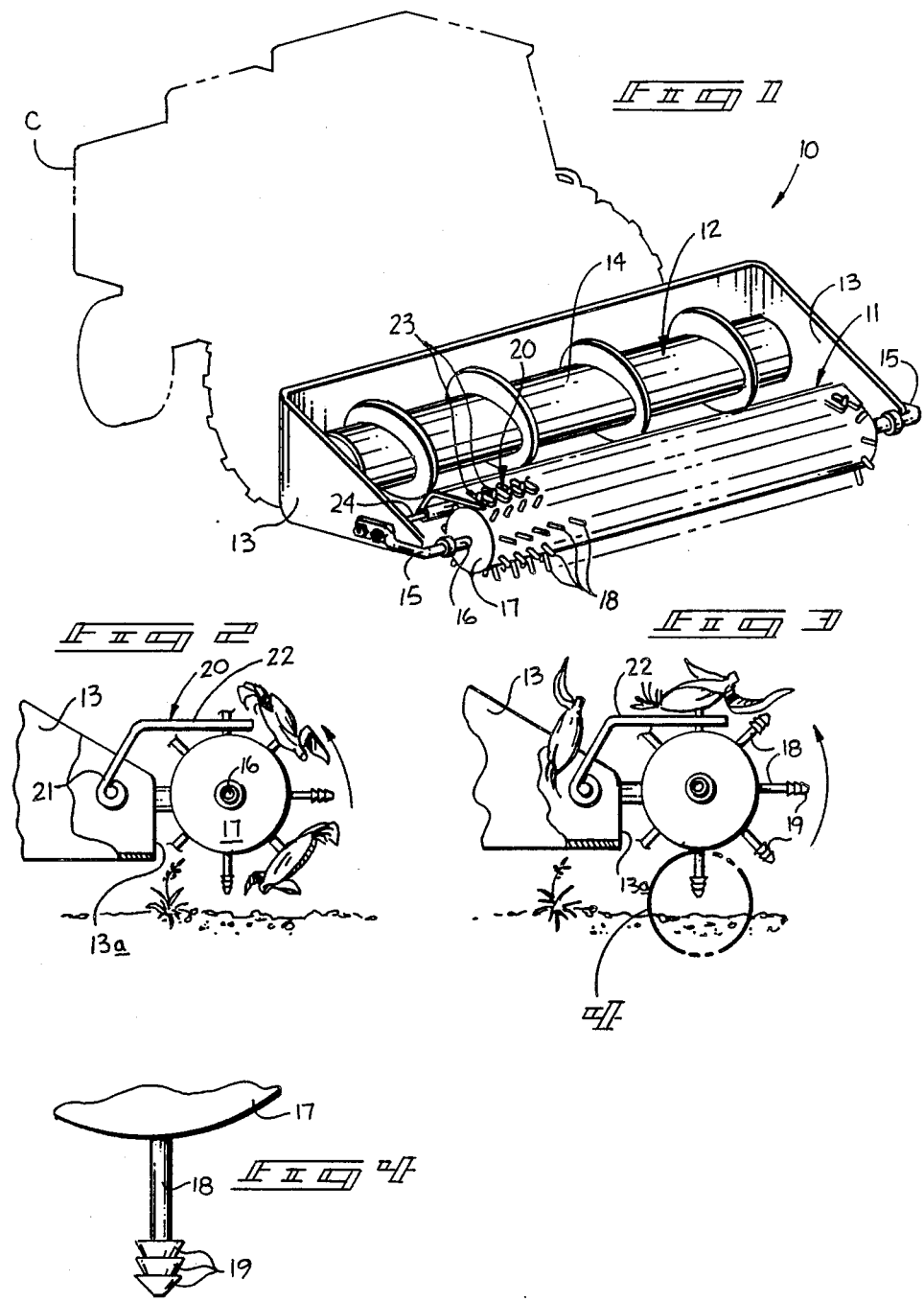

CORN HARVESTING APPARATUS

BACKGROUND OF THE INVENTION

1. Field of the Invention

The field of invention relates to harvesting apparatus, and more particularly pertains to corn harvesting apparatus wherein the same utilizes piercer spikes to secure ears of corn and direct same to a hopper and conveyor feed organization.

2. Description of the Prior Art

The use of harvesting apparatus is well known in the prior art. Corn harvesting apparatus has been utilized to harvest corn from their associated stalks. During a harvesting procedure, however, many ears of corn have heretofore been lost due to the ever-spiralling costs of labor to retrieve ears of corn that have fallen to the ground. The instant invention attempts to overcome the problem by providing a corn harvesting apparatus to retrieve corn ears that have fallen to the ground. Examples of the prior art include U.S. Pat. No. 8,719,034 to Lange setting forth a ground corn harvesting apparatus utilizing spaced conveyor rows including fingers associated therewith to support the corn and direct the same rearwardly to a conveyor apparatus. The Lange patent exemplifies the prior art utilizing elaborate conveyor chain organizations, as opposed to the compact and effective apparatus utilized by the instant invention.

U.S Pat. No. 3,492,797 to Sears sets forth a corn harvesting apparatus of typical construction to harvest corn from associated stalks and strip the corn ears therefrom.

U.S. Pat. No. 4,438,619 to Helm, et al., sets forth another example of a multiple conveyor organization provided with spaced rows of conveyors oriented parallel to the direction of movement of the apparatus to lift and direct ears of corn rearwardly to a storage assembly.

U.S. Pat. No. 3,771,300 to Jourdan provides a harvesting and vegetable chopping apparatus to lift and chop vegetables in a harvesting procedure.

U.S. Pat. No. 4,801,644 to Henderson sets forth a combine harvester wherein an endless belt secures a plurality of flexible tines extending across a channel receiving grain therethrough. The tines protrude through slots, but are folded during a return course prior to a harvesting sweep through the apparatus.

As such, it may be appreciated that there is a continuing need for a new and improved corn harvesting apparatus which addresses both the problems of ease of use and effectiveness in construction, and in this respect, the present invention substantially fulfills this need.

SUMMARY OF THE INVENTION

In view of the foregoing disadvantages inherent in the known types of harvesting apparatus now present in the prior art, the present invention provides a corn harvesting apparatus wherein the same utilizes a spiked drum rotatably mounted to pierce and direct ears of corn rearwardly thereof to an associated conveyor hopper assembly. As such, the general purpose of the present invention, which will be described subsequently in greater detail, is to provide a new and improved corn harvesting apparatus which has all the advantages of the prior art harvesting apparatus and none of the disadvantages.

To attain this, the present invention includes a corn harvesting apparatus wherein the same provides for a shovel-like hopper formed with triangular sides with a conveyor screw assembly positioned rearwardly of the hopper and a harvesting roll rotatably mounted forwardly of the hopper adjacent forward apex portions of the triangular sides. The harvesting roll includes axially parallel rows of spikes formed with a series of barbed ends thereon. The spikes are aligned in rows and are circumferentially aligned relative to one another. The spikes are spaced a distance equal to a spacing of slots formed within a stripper plate overlying the roll whereupon rotation of the roll strips the ears of corn from the spikes and directs them rearwardly to the conveyor assembly.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved corn harvesting apparatus which has all the advantages of the prior art harvesting apparatus and none of the disadvantages.

It is another object of the present invention to provide a new and improved corn harvesting apparatus which may be easily and efficiently manufactured and marketed.

It is a further object of the present invention to provide a new and improved corn harvesting apparatus which is of a durable and reliable construction.

An even further object of the present invention is to provide a new and improved corn harvesting apparatus which is susceptible of a low cost of manufacture with regard to both materials and labor, and which accordingly is then susceptible of low prices of sale to the consuming public, thereby making such corn harvesting apparatus economically available to the buying public.

Still yet another object of the present invention is to provide a new and improved corn harvesting apparatus which provides in the apparatus and methods of the prior art some of the advantages thereof, while simultaneously overcoming some of the disadvantages normally associated therewith.

Still another object of the present invention is to provide a new and improved corn harvesting apparatus wherein the same pierces individual ears of corn and directs them rearwardly to a conveyor hopper upon being stripped from the piercing apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in association with a conventional combine.

FIG. 2 is a partial orthographic side view taken in elevation of the harvesting roll and associated stripper plate.

FIG. 3 is a partial orthographic side view taken in elevation of the harvesting roll and stripper plate directing ears of corn rearwardly into the feed hopper.

FIG. 4 is an orthographic view of section 4, as illustrated in FIG. 3.

DESCRIPTION OF THE PREFERRED EMBODIMENT

With reference now to the drawings and in particular to FIGS. 1 to 4 thereof, a new and improved corn harvesting apparatus embodying the principles and concepts of the present invention and generally designated by the reference numeral 10 will be described.

More specifically, the corn harvesting apparatus 10 essentially comprises a rotating harvesting drum 11 cooperating with a shovel-shaped conveyor hopper 12. The hopper 12 is formed with triangular truncated sides 13, wherein the triangular sides are formed with a generally planar bottom integrally secured to a planar floor of the hopper 12. The truncated forward end 13a of the sides 13 terminate rearwardly of the drum 11. A screw conveyor 14 of conventional construction is rotatably mounted in cooperation with the combine "C" for directing harvested ears of corn to the combine for storage during a harvesting procedure.

A "U" shaped support arm 15 is fixedly secured to exterior surfaces of each side 18 of the hopper 12 and extends rearwardly beyond the truncated edge 13a in a horizontal orientation and is rotatably coupled at its forward terminal end to a roll support axle 16 orthogonally directed relative to the sides 13. The support axle 16 rotatably mounts a cylindrical harvest roll 17 formed with aligned linear rows of harvest spikes 18, wherein the rows are axially parallel to the axle axis 16 and are symmetrically spaced about the surface of the roll 17. Roll 17 is rotated in a conventional manner by farm machinery of this class utilizing a belt/chain or internal motor drive for example. The harvesting roll 17, as illustrated in FIG. 1, is spaced forwardly and parallel to the rotary screw conveyor 14. Further the spikes are positioned in a circular circumferential array of spikes, wherein each circular array is equally spaced relative to one another a predetermined distance. The circular array of spikes is spaced the predetermined distance equal to the spacing of slots 23 formed within an upper horizontal leg 22 of an "L" shaped stripper plate 20. A lower leg 21 of the "L" shaped stripper leg is directed interiorly and downwardly relative to the hopper 12 and is secured to a stripper plate support shaft 24 orthogonally mounted between interior surfaces of the triangular sides 13 spaced rearwardly of the roll support axle 16, as illustrated in FIGS. 2 and 3 for example. It should be noted the slots 28, while aligned with the circumferential arrays of spikes 18, are spaced a distance above the roll 17 a length substantially equal to that of the smooth shank portions of the spikes 18, as illustrated in FIG. 4 for example. The outer terminal ends of each spike 18 is formed with a coaxially aligned series of truncated conical barbs 19 that are arranged for piercing individual ears of corn about a ground surface and directing the corn rearwardly into the hopper 12 for transport by the screw conveyor 14. The harvest roll or drum 17 is conventionally of a twelve inch diameter and nominally eight feet long. Steel rods are utilized approximately six inches long and of a nominal quarter inch diameter and are spaced apart approximately one and one half inches center to center to effectively secure ears of corn that the device is transported over.

The forward edge of the upper horizontal leg 22 of the stripper plate 20 extends overlying the harvesting roll 17 beyond the axis thereof to properly receive, engage, and align the spikes 18 as they are directed towards the hopper and into the slots 23 of the stripper plate.

It should be noted that the drum is conventionally of a twelve inch diameter and nominally eight feet long. Steel rods are utilized approximately six inches long and of a nominal quarter inch diameter and are spaced apart approximately one and one half inches center to center to effectively secure ears of corn that the device is transport over.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A corn harvesting apparatus in combination with a self-propelled vehicle, wherein the apparatus comprises, a shovel-shaped hopper including parallel spaced planar sides, each terminating forwardly in a forward edge, and including a rear edge integrally formed to a rear planar wall, and a bottom edge of each planar side integrally secured to a floor of the hopper, and an elongate rotary conveyor mounted adjacent the rear wall between the sides for feeding of harvested corn articles to the vehicle, and a rotary harvesting drum mounted forwardly of the conveyor and spaced from the forward edge of each side wall, and wherein the harvesting drum is of a fixed length less than a length defined between interior surfaces of the planar sides and is rotatably mounted about a harvesting drum axle coaxially directed through the harvesting drum parallel to an axis defined by the rotary conveyor, and wherein the harvesting drum includes spaced series of spikes directed radially outwardly of an exterior surface of the harvesting drum mounted in linear rows along the exterior surface of the harvesting drum, wherein the rows are parallel to a drum axis defined by the rotary drum, and a plurality of rows of spikes are symmetrically mounted about the harvesting drum, and the spikes define a circular array, each circular array spaced a predetermined distance relative to one another along the surface of the rotary drum, and including a lower leg of a stripper plate fixedly mounted to a stripper plate support shaft mounted interiorly of the planar sides and rearwardly of the harvesting drum, and the stripper plate further includes an upper leg spaced above the rotary drum a distance less than that of a length defined by the spikes.

2. A corn harvesting apparatus as set forth in claim 1 wherein each of the spikes terminates in a series of truncated conical barbs coaxially mounted to a forward end of each spike.

3. A corn harvesting apparatus as set forth in claim 2 wherein the stripper plate includes a series of slots, the slots spaced apart a predetermined distance substantially equal to the predetermined distance defined between the circular arrays of spikes.

4. A corn harvesting apparatus as set forth in claim 3 wherein the upper leg of the stripper plate defines a forward edge, the forward edge extends beyond the axially center of the harvesting drum.

5. A corn harvesting apparatus as set forth in claim 4 further including a plurality of "U" shaped brackets, each "U" shaped bracket including a rear end integrally mounted to an outer surface of each planar side wall and a forward end of each "U" shaped bracket rotatably mounting the harvesting drum axle therebetween.

* * * * *